United States Patent
Shimazawa et al.

(10) Patent No.: US 6,406,556 B1
(45) Date of Patent: Jun. 18, 2002

(54) METHOD FOR MANUFACTURING THIN-FILM MAGNETIC HEAD WITH MAGNETORESISTIVE EFFECT MULTI-LAYERED STRUCTURE

(75) Inventors: Koji Shimazawa; Tetsuro Sasaki; Manabu Ohta, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/272,295

(22) Filed: Mar. 19, 1999

(30) Foreign Application Priority Data

Apr. 2, 1998 (JP) .......................................... 10-105366

(51) Int. Cl.$^7$ .............................................. H01F 10/08
(52) U.S. Cl. .................... 148/108; 29/608.03; 148/121; 360/113
(58) Field of Search ................................ 148/108, 121, 148/527; 360/113; 29/603.08

(56) References Cited

U.S. PATENT DOCUMENTS

| | | | |
|---|---|---|---|
| 5,206,590 A | | 4/1993 | Dieny et al. |
| 5,422,571 A | | 6/1995 | Gurney et al. |
| 5,784,225 A | * | 7/1998 | Shimazawa et al. ........ 360/113 |

* cited by examiner

Primary Examiner—John P Sheehan
(74) Attorney, Agent, or Firm—Arent Fox Kintner Plotkin & Kahn, PLLC

(57) ABSTRACT

A manufacturing method of a thin-film magnetic head with a MR multi-layered structure using exchange coupling magnetic bias, has a step of forming the MR multi-layered structure, and a step of providing the exchange coupling magnetic bias to the MR multi-layered structure by a temperature-annealing process. The temperature-annealing process includes a step of gradually decreasing the temperature of the multi-layered structure to a first predetermined temperature under application of magnetic field toward a predetermined direction.

13 Claims, 10 Drawing Sheets

—△— 1000 HOURS APPLICATION
—●— 100 HOURS APPLICATION

81 PINNED DIRECTION AT PIN ANNEAL PROCESS
80
82 APPLIED MAGNETIC FIELD FOR MEASUREMENT

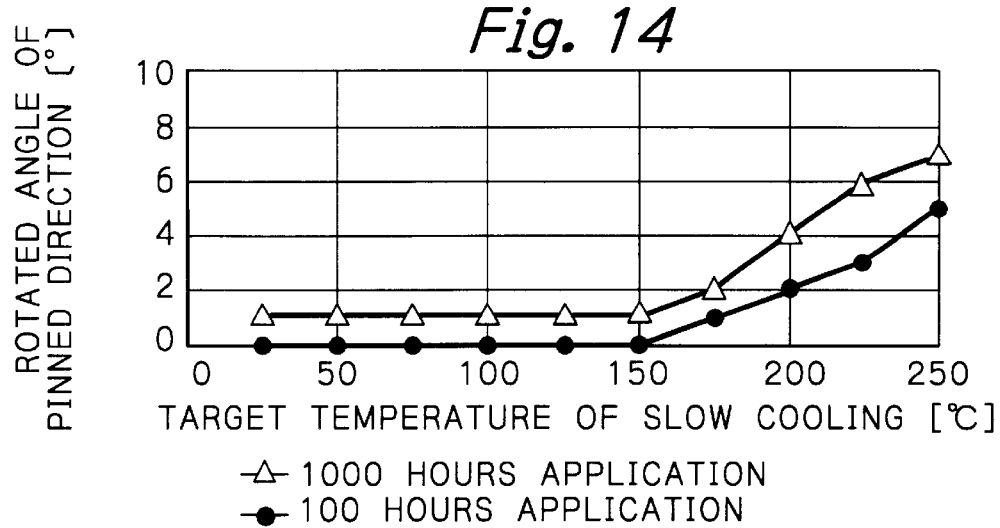
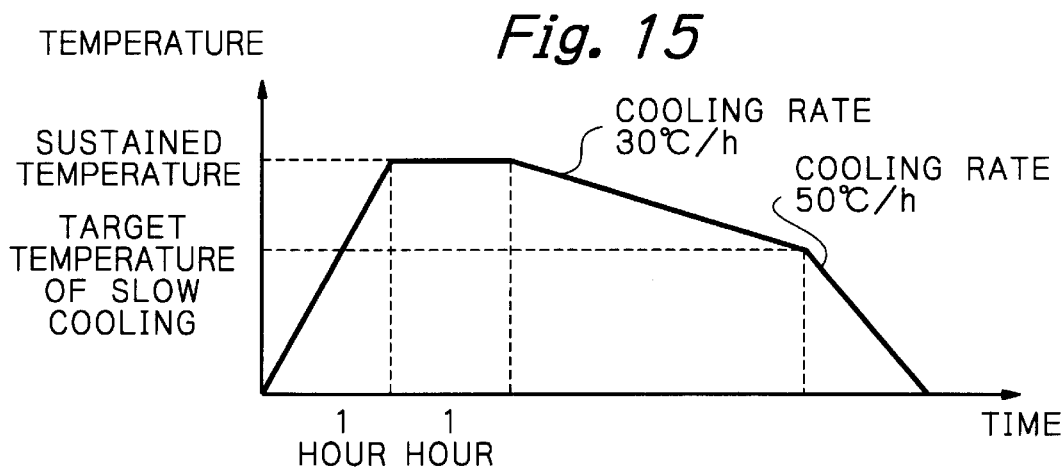
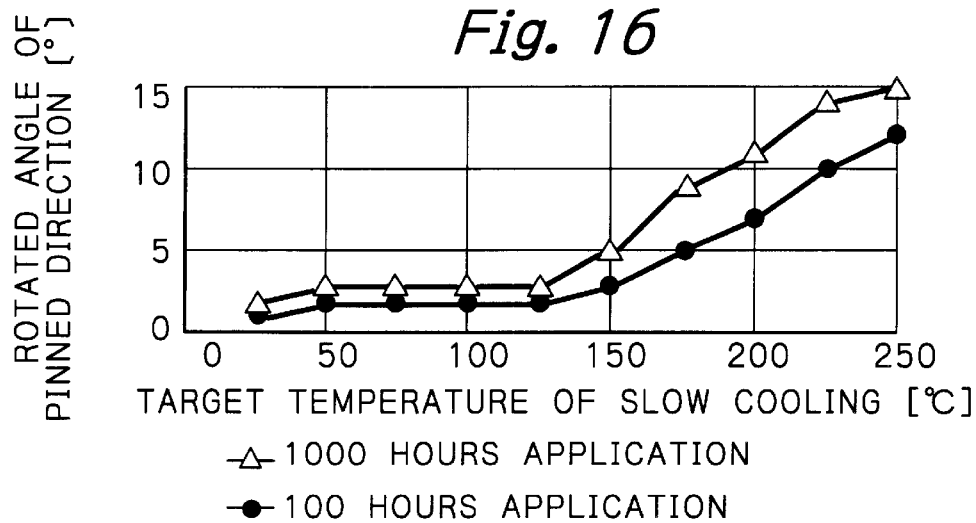

METHOD FOR MANUFACTURING THIN-FILM MAGNETIC HEAD WITH MAGNETORESISTIVE EFFECT MULTI-LAYERED STRUCTURE

FIELD OF THE INVENTION

The present invention relates to a manufacturing method of a thin-film magnetic head with a magnetoresistive effect (MR) multi-layered structure using exchange coupling magnetic bias, such as spin valve effect MR sensor, used for HDD (Hard Disk Drive) units.

DESCRIPTION OF THE RELATED ART

Recently, thin-film magnetic heads with MR read sensors based on spin valve effect of giant MR (GMR) characteristics are proposed (U.S. Pat. Nos. 5,206,590 and 5,422,571) in order to satisfy the requirement for ever increasing data storage densities in today's magnetic storage systems like hard disk drive units. The spin valve effect multi-layered structure includes first and second thin-film layers of a ferromagnetic material separated by a thin-film layer of non-magnetic and electrically conductive material, and an adjacent layer of anti-ferromagnetic material is formed in physical contact with the second ferromagnetic layer to provide exchange bias magnetic field by exchange coupling at the interface of the layers. The magnetization direction in the second ferromagnetic layer is constrained or maintained by the exchange coupling, hereinafter the second layer is called "pinned layer". On the other hand the magnetization direction of the first ferromagnetic layer is free to rotate in response to an externally applied magnetic field, hereinafter the first layer is called "free layer". The direction of the magnetization in the free layer changes between parallel and anti-parallel against the direction of the magnetization in the pinned layer, and hence the magneto-resistance greatly changes and giant magneto-resistance characteristics are obtained.

The output characteristic of the spin valve MR read sensor depends upon the angular difference of magnetization between the free and pinned ferromagnetic layers. The direction of the magnetization of the free layer is free to rotate in accordance with an external magnetic field. That of the pinned layer is fixed to a specific direction (called as "pinned direction") by the exchange coupling between this layer and adjacently formed anti-ferromagnetic layer.

In this kind of spin valve effect MR read sensor structure, the direction of the magnetization in the pinned layer may change in some cases by various reasons. If the direction of the magnetization changes, the angular difference between the pinned and free layers changes too and therefore the output characteristic also changes. Consequently stabilizing the direction of the magnetization in the pinned layer is very important.

In order to stabilize the direction of the magnetization by the strong exchange coupling between the pinned and anti-ferromagnetic layers, a process of temperature-annealing (pin anneal process) under an external magnetic field with a specific direction is implemented. The pin annealing is done as follows, first the temperature is elevated up to the Neel point under the magnetic field strength of 500 Oe to 3 k Oe, and held for about 30 minutes to 5 hours, and then cooled down to room temperature. By this pin anneal process, the exchange coupling is regulated at the interface of the pinned and anti-ferromagnetic layers toward the direction of the externally applied magnetic field.

However, the magnetoresistance characteristics may be changed under actual high temperature operation of a hard disk drive unit, even if the pin anneal processing is properly implemented. This degradation is caused by the high temperature stress during operation of the hard disk drive unit and by the magnetic field by a hard magnet layer used for giving a bias magnetic field to the free layer.

The detail of this degradation is as follows. The pinned direction of the magnetization in the pinned layer is different from that of the magnetic field ($H_{HM}$) by the hard magnet. And hence the direction of the magnetization of the pinned layer which is contacted with the anti-ferromagnetic layer is slightly rotated toward the direction of $H_{HM}$ (hereinafter the direction of the magnetization of the pinned layer is expressed as θp). In the anti-ferromagnetic material layer, the Neel point temperature differs from location to location inside the layer from macroscopic point of view, and it is distributed in a certain range of temperature. Even if the temperature is less than the "bulk" Neel point (average Neel point), there could be small area whose micro Neel point temperature is low and where the exchange coupling with the pinned layer disappears. When such spin valve effect MR read sensor is operated at a high temperature T, which is less than the blocking temperature at which the exchange couplings of all microscopic areas disappear, and then cooled down to usual room temperature, some microscopic area whose Neel temperatures are less than T is effectively annealed again and the direction of the magnetization is rotated to θp. The total amount of the θp rotated area by the temperature cycle determines the magnetic structure of the anti-ferromagnetic layer and the new direction of the magnetization of the pinned layer.

As stated in the above paragraph, usage of such spin valve MR read sensor at high temperature may cause a change of the pinned direction in the pinned layer, and the electrical output characteristics of the sensor are degraded in signal levels, and waveform symmetry.

Hereinafter, the degradation of the output characteristics of the sensor due to the rotation of the pinned direction will be described with reference to drawings.

The spin valve effect sensor operates by detecting change in its electrical resistance depending upon an angle between directions of magnetization in the pinned and free layers. The electrical resistance R is expressed by $R=(1-\cos \theta)/2+\beta$, where θ is the angle between directions of magnetization in the pinned and free layers and β is an electrical resistance (Rs) when the magnetization directions in the pinned and free layers are in parallel (θ=0 degree) as illustrated in FIG. 1a. When the magnetization directions in the pinned and free layers are in anti-parallel (θ=180 degrees) as illustrated in FIG. 1b, the electrical resistance becomes $R=1+\beta$. Also, when the magnetization directions in the pinned and free layers are orthogonal (θ=90 degrees) as illustrated in FIG. 1c, the electrical resistance becomes $R=\frac{1}{2}+\beta$.

As illustrated in FIG. 2, the spin valve effect sensor produces output voltage in response to the change in magnetization direction of the free layer caused by application of changing leakage magnetic field from the magnetic recording medium. Suppose that the direction of magnetization in the free layer rotates by +20 degrees (first magnetization state of the free layer) and by −20 degrees (second magnetization state of the free layer) due to the leakage magnetic field from the magnetic recording medium. If the pinned direction is normal, the resistance value across the sensor at the first magnetization state $R_{F1}$ is $R_{F1}=(1-\cos 70°)/2=0.329$ and the resistance value across the sensor at the second magnetization state $R_{F2}$ is $R_{F2}=(1-\cos 110°)/2=0.671$ as shown in FIG. 3a. Thus, the difference Δ R becomes as $\Delta R = R_{F2} - R_{F1} = 0.342$. Whereas, if the pinned direction rotates by 20 degrees from the normal direction, the resistance value across the sensor at the first magnetization state $R_{F1}$ is $R_{F1} = (1 - \cos 500)/2 = 0.178$ and the resistance value across the sensor at the second magnetization state $R_{F2}$ is $R_{F2} = (1 - \cos 90°)/2 = 0.500$ as shown in FIG. 3b. Thus, the difference $\Delta R$ becomes as $\Delta R = R_{F2} - R_{F1} = 0.322$. Therefore, 20 degrees rotation of the pinned direction results degradation of 5.8% in the sensor output.

It will be understood from the above-description that thin-film magnetic heads with good output characteristics can be fabricated by stabilizing their pinned directions under high temperature environment. However, it is undesired to execute the pin anneal process of the magnetic heads for a long time in order to give stable pinned direction to them because total period of time for fabricating the thin-film magnetic heads increases.

SUMMARY OF THE INVENTION

It is therefore an object of the present invention to resolve the aforementioned problems, and to provide a manufacturing method of a thin-film magnetic head, whereby stable pinned direction at high temperature can be realized by a short time pin anneal process.

According to the present invention, a manufacturing method of a thin-film magnetic head with a MR multi-layered structure using exchange coupling magnetic bias, has a step of forming the MR multi-layered structure, and a step of providing the exchange coupling magnetic bias to the MR multi-layered structure by a temperature-annealing process. The temperature-annealing process includes a step of gradually decreasing the temperature of the multi-layered structure to a first predetermined temperature under application of magnetic field toward a predetermined direction.

Slow cooling pin anneal process for gradually decreasing the temperature of the multi-layered structure to a target temperature under application of magnetic field toward a predetermined direction (pinned direction) can give stronger exchange coupling within a short process period of time. Thus, a spin valve effect MR sensor with more stable direction of the magnetization of the pinned layer under high temperature atmosphere is realized. By stabilizing the direction of the magnetization of the pinned layer, the degradations of signal level and waveform symmetry of output waveforms under high temperature atmosphere can be greatly reduced. In addition, the manufacturing process can be shortened in time.

It is preferred that the gradually decreasing step is a step of decreasing the temperature of the MR multi-layered structure to the first predetermined temperature at a cooling rate within a range of 10° C./hour to 50° C./hour under application of magnetic field toward the predetermined direction. More preferably, the cooling rate is about 10° C./hour.

It is preferred that the first predetermined temperature is a temperature higher than a room temperature. More preferably, the forming step includes a step of forming a MR multi-layered structure with a ferromagnetic layer and an anti-ferromagnetic layer using exchange coupling magnetic bias between the layers, and the first predetermined temperature is a temperature at which a reversed ratio of the anti-ferromagnetic layer becomes about 0.1.

The spin valve effect MR multi-layered structure may include first and second layers of a ferromagnetic material separated by a layer of non-magnetic electrically conductive material, and an adjacent layer of anti-ferromagnetic material formed in physical contact with the second ferromagnetic layer.

It is preferred that the temperature-annealing process is done at a dedicated heat treatment process under application of the magnetic field, independent from processes in wafer fabrication (from formation of the MR multi-layered structure on a wafer to just before dicing of the wafer into bars), that the temperature-annealing process is done at a part of another heat treatment process in wafer fabrication, or that the temperature-annealing process is done at a dedicated heat treatment process under application of the magnetic field, independent from processes in wafer fabrication and at a part of another heat treatment process in the wafer fabrication.

Preferably, at the independent dedicated process for temperature-annealing under application of magnetic field toward the predetermined direction, the heat treatment temperature is elevated to a second predetermined temperature (Neel temperature of the anti-ferromagnetic material of about 150 to 300° C.) and sustained for a specified duration time, and then it is gradually cooled down.

Also preferably, the another heat treatment process is a resist curing process.

It is preferred that the resist curing process includes a process for elevating the heat treatment temperature to a second predetermined temperature and for sustaining it for a specified duration time under application of magnetic field toward a direction perpendicular to the predetermined direction.

Further objects and advantages of the present invention will be apparent from the following description of the preferred embodiments of the invention as illustrated in the accompanying drawings.

BRIEF DESCRIPTION OF THE DRAWINGS

FIG. 14 is a graph of rotated angle of the pinned direction versus target temperature of slow cooling;

FIG. 15 illustrates a pin anneal profile in another comparison example;

FIG. 16 is a graph of rotated angle of the pinned direction versus target temperature of slow cooling;

DESCRIPTION OF THE PREFERRED EMBODIMENTS

Figure 1C:
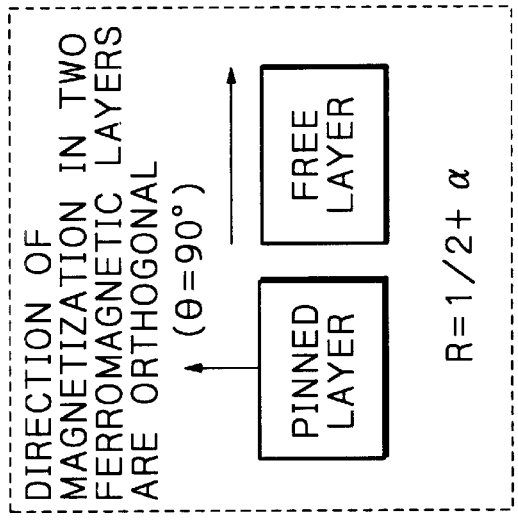
FIGS. 1a to 1c illustrate the principal of the spin valve effect.
Figure 1B:
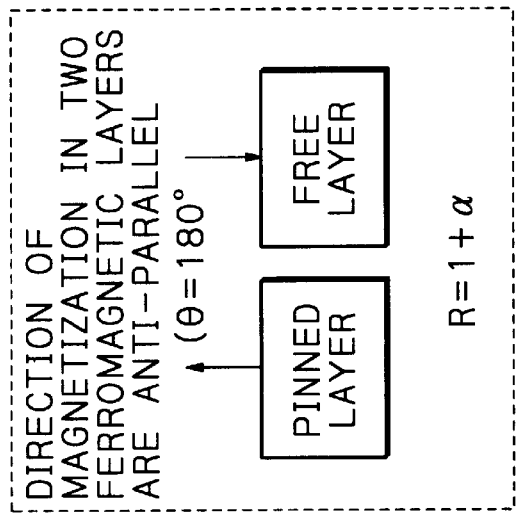
Figure 1A:
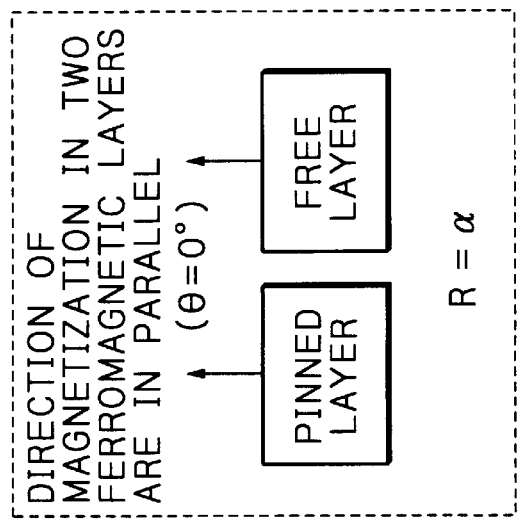
Figure 2:
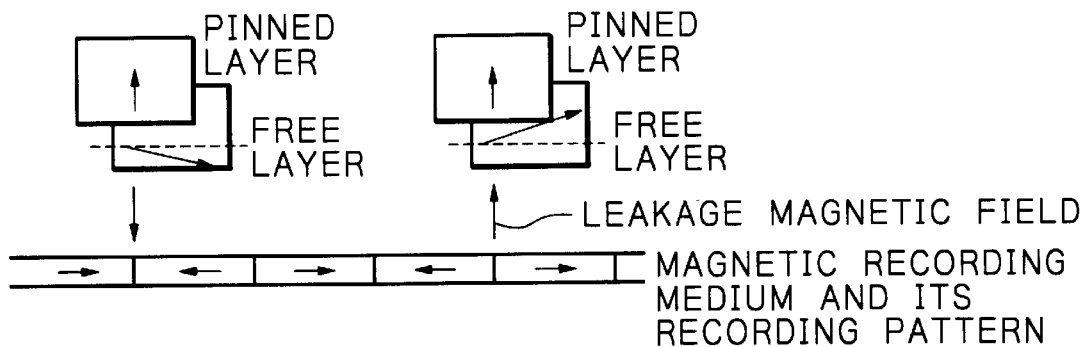
FIG. 2 illustrates operations of a spin valve effect MR sensor.
Figure 3A:
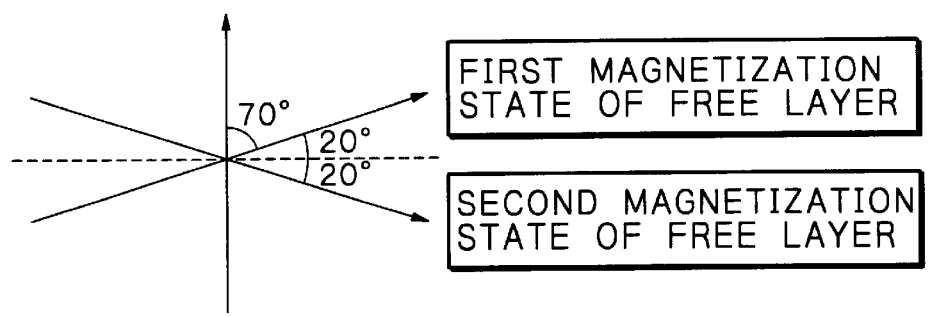
FIGS. 3a and 3b illustrate degradation of output characteristics of the spin valve effect MR sensor when its pinned direction rotates.
Figure 3B:
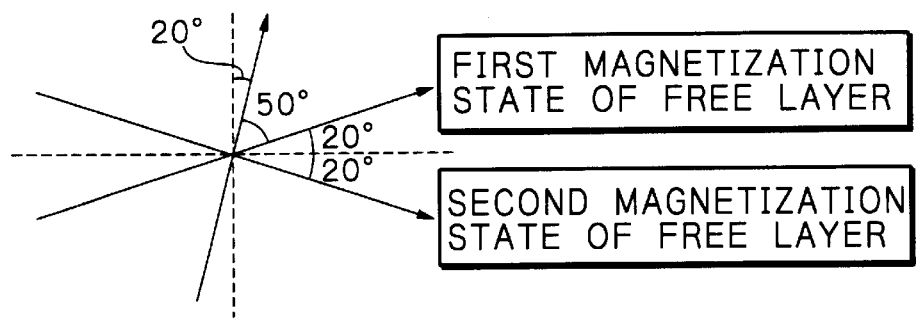
Figure 4:
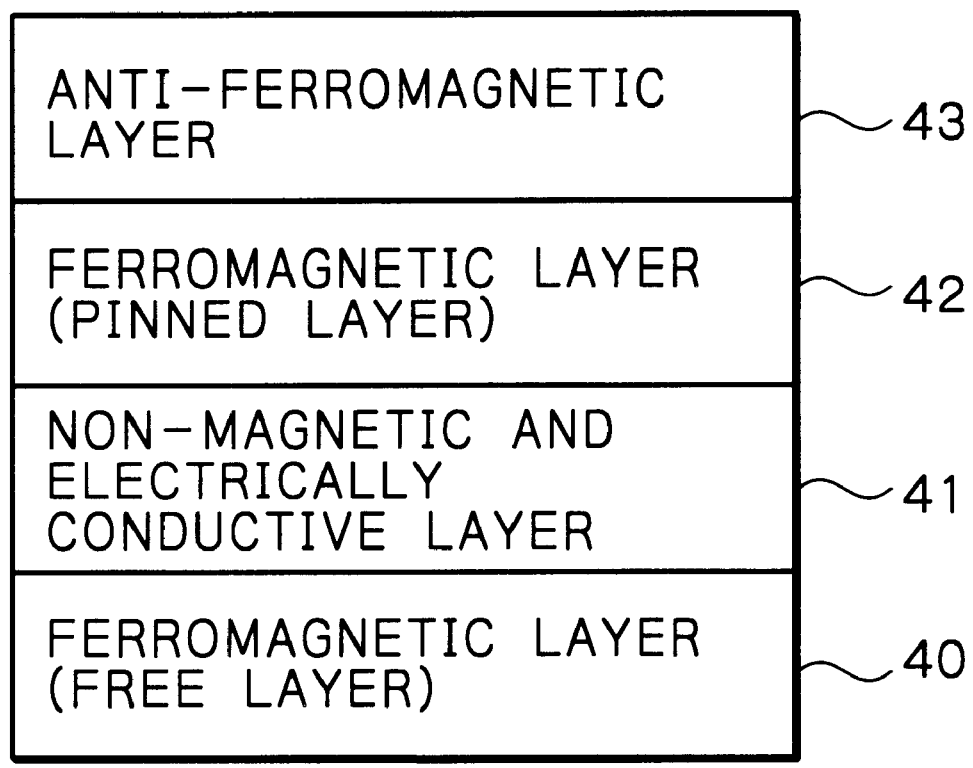
FIG. 4 is a cross-sectional view illustrating a multi-layered structure of the spin valve effect MR sensor fabricated in a preferred embodiment according to the present invention.

FIG. 4 illustrates multi-layered structure of the spin valve effect MR sensor fabricated in a preferred embodiment according to the present invention. Referring to FIG. 4, reference number 40 and 42 are first and second ferromagnetic thin-film layers respectively which are separated by a thin-film layer 41 of a non-magnetic electrically conductive metallic material. On the second ferromagnetic thin-film layer 42, a thin-film layer 43 of anti-ferromagnetic material is stacked, and a magnetic field generated by the exchange coupling at the interface of the thin-film layers 42 and 43 magnetizes the ferromagnetic layer 42, and so to speak the layer is pinned. The first ferromagnetic thin-film layer 40 is a free layer in which there is no effect of exchange coupling and hence the magnetization is free to rotate in response to a leakage magnetic field externally applied from a magnetic recording medium.

Before discussing the manufacturing method according to the present invention, dispersion of blocking temperature and reversed ratio with respect to various anti-ferromagnetic materials are explained.

Figure 5:
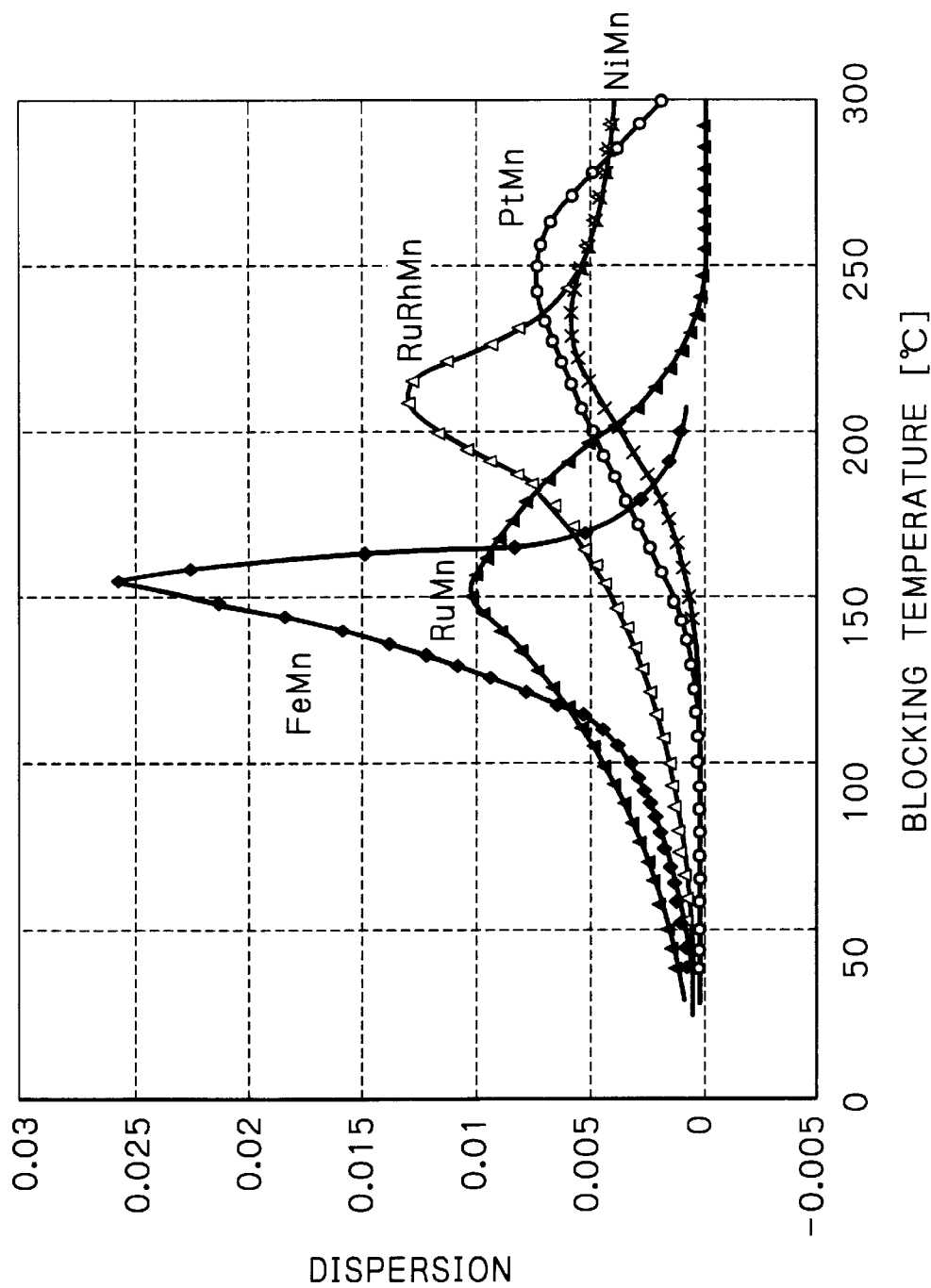
FIG. 5 is dispersion curves of blocking temperature with respect to various anti-ferromagnetic materials used for the anti-ferromagnetic layer of the spin valve effect MR sensor.

FIG. 5 shows dispersion curves of blocking temperature with respect to various anti-ferromagnetic materials used for the anti-ferromagnetic layer 43 of the spin valve effect MR multi-layered structure. In the figure, the horizontal axis indicates the blocking temperature and the vertical axis indicates the dispersion. The blocking temperature is a temperature at which the exchange coupling of a microscopic area with the pinned layer disappears, namely the exchange coupling magnetic bias Hua caused by this microscopic area becomes zero. As will apparent from FIG. 5, the blocking temperature disperses and the dispersion curves of the various anti-ferromagnetic materials differ with each other.

Tables 1 to 3 show the measured result of reversed ratios of the anti-ferromagnetic layer 43 using each of three typical anti-ferromagnetic materials RuRhMn, RuMn and PtMn. It should be noted that a reversed ratio at a certain temperature represents a ratio of microscopic areas with blocking temperatures that are equal to or less than this certain temperature with respect to all microscopic areas in the anti-ferromagnetic layer. Therefore, a temperature with the reversed ratio of 0 corresponds to a temperature that is lower than the blocking temperatures of all microscopic areas, and also a temperature with the reversed ratio of 1 corresponds to a temperature which is higher than the blocking temperatures of all microscopic areas. The latter temperature with the reversed ratio of 1 represents the blocking temperature of that layer.

TABLE 1

Ta(5 nm)/NiFe(9 nm)/Co(1 nm)/Cu(3 nm)/Co(2 nm)/RuRhMn(10 nm)/Ta(5 nm)

| Measurement Temperature (° C.) | Exchange Coupling Magnetic Bias Hua (Oe) | Coercive Force of Pinned Layer (Oe) | Reversed Ratio |
|---|---|---|---|
| 25 | 600 | 96 | 0.0000 |
| 50 | 596 | 96 | 0.0033 |
| 75 | 584 | 97 | 0.0133 |
| 100 | 557 | 100 | 0.0358 |
| 125 | 498 | 108 | 0.0850 |
| 150 | 445 | 104 | 0.1292 |
| 175 | 248 | 112 | 0.2933 |
| 200 | 20 | 132 | 0.4833 |
| 225 | −300 | 112 | 0.7500 |
| 250 | −538 | 100 | 0.9467 |
| 275 | −576 | 100 | 0.9800 |

TABLE 2

Ta(5 nm)/NiFe(9 nm)/Co(1 nm)/Cu(3 nm)/Co(2 nm)/RuMn(10 nm)/Ta(5 nm)

| Measurement Temperature (° C.) | Exchange Coupling Magnetic Bias Hua (Oe) | Coercive Force of Pinned Layer (Oe) | Reversed Ratio |
|---|---|---|---|
| 25 | 448 | 60 | 0.0000 |
| 50 | 421 | 58 | 0.0301 |
| 75 | 394 | 56 | 0.0603 |
| 100 | 353 | 60 | 0.1060 |
| 125 | 336 | 64 | 0.1250 |
| 150 | 248 | 72 | 0.2232 |
| 175 | 104 | 80 | 0.3839 |
| 200 | −104 | 92 | 0.6161 |
| 225 | −336 | 92 | 0.8750 |
| 250 | −424 | 80 | 0.9732 |
| 275 | −400 | 80 | 0.9464 |

TABLE 3

Sub/Ta(5 nm)/PtMn(30 nm)/Co(3 nm)/Cu(3 nm)/Co(1 nm)/NiFe(9 nm)/Ta(5 nm)

| Measurement Temperature (° C.) | Exchange Coupling Magnetic Bias Hua (Oe) | Coercive Force of Pinned Layer (Oe) | Reversed Ratio |
|---|---|---|---|
| 25 | 718 | 118 | 0.0000 |
| 50 | 704 | 119 | 0.0100 |
| 75 | 698 | 120 | 0.0140 |
| 100 | 693 | 116 | 0.0180 |
| 125 | 670 | 121 | 0.0340 |
| 150 | 646 | 118 | 0.0500 |
| 175 | 559 | 124 | 0.1110 |
| 200 | 412 | 123 | 0.2130 |
| 225 | 159 | 133 | 0.3890 |
| 250 | −59 | 143 | 0.5410 |
| 275 | −294 | 142 | 0.7050 |
| 300 | −443 | 139 | 0.8080 |
| 325 | −524 | 134 | 0.8640 |
| 350 | −560 | 135 | 0.8900 |
| 375 | −540 | 136 | 0.8760 |

These measurements were executed as follows.

(1) First, spin valve effect MR multi-layered structures with anti-ferromagnetic layers 43 of RuRhMn (Ru: 3 at %, Rh:

15 at %, Mn: at %), RuMn (Ru: 23 at %, Mn: 77 at %) and PtMn (Pt: 48 at %, Mn: 52 at %), respectively were fabricated.

(2) Pin anneal processes were executed at temperatures at which the exchange couplings of all microscopic areas in the anti-ferromagnetic layer 43 disappear (temperature higher than the blocking temperatures of all microscopic areas) under application of the magnetic field toward the desired direction of the magnetization in the pinned layer. Actually, the pin anneal processes at 270° C. were executed for RuRhMn and RuMn, and the pin anneal process at 280° C. was executed for PtMn.

(3) The exchange coupling magnetic bias Hua of each multi-layered structure was measured at the room temperature and measured result was expressed as $Hua_1$.

(4) Then, the temperatures of the multi-layered structures were elevated to each of the measurement temperatures shown in Tables 1 to 3.

(5) Thereafter, the temperature of the multi-layered structures were gradually decreased to the room temperature under application of the magnetic field toward opposite direction against that during the pin anneal process of (2).

(6) The exchange coupling magnetic bias Hua of each multi-layered structure was measured at the room temperature and measured result was expressed as $Hua_2$.

(7) The reversed ratio at the measurement temperature was calculated from, Reversed Ratio=$(Hua_1-Hua_2)/2Hua_1$.

The manufacturing process of this kind of spin valve effect MR sensors are quite common in the industry except for the pin anneal process during the wafer fabrication. Therefore, only a pin anneal process is described in detail hereinafter.

Figure 6:
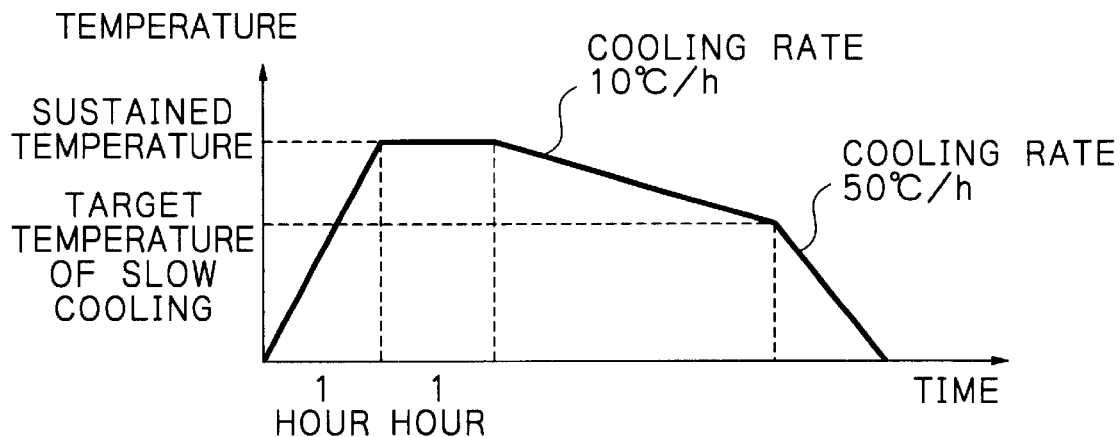
FIG. 6 illustrates a pin anneal profile in the preferred embodiment according to the present invention.

FIG. 6 illustrates a pin anneal process profiles of this embodiment according to the present invention, and the horizontal and vertical axes of the profiles are associated with time and temperature, respectively.

The embodiment shown in the figure relates to manufacturing process of a composite type thin-film magnetic head that consists of a spin valve effect MR sensor or element with the anti-ferromagnetic layer 43 made of RuRhMn and an inductive write element. Generally, at the wafer fabrication process of such composite type thin-film magnetic heads, firstly many spin valve effect MR sensors are built on a wafer, secondly inductive write elements are formed on the MR sensors. In this embodiment of the present invention, the resist curing process for formation of first and second insulator layers of coils of the inductive write element is utilized as pin anneal process for magnetization of the pinned layer 42. Hereinafter, this pin anneal process will be called as "resist curing pin anneal process".

At the process of the formation of the first and/or second insulation layer of the coils, the curing of the resist is done by elevating the heat treatment temperature from the room temperature to a temperature of about 250° C. for almost 1 hour and sustaining it for almost 1 hour, under application of magnetic field of about 200 Oe toward the direction of the magnetization in the free layer 40 (called as "free direction") in order to control the magnetic domain of shield layers in the MR sensor. Then, the heat treatment temperature is decreased. During this temperature decreasing period, pin anneal process according to the present invention is executed. Namely, under application of magnetic field of about 3 k Oe toward the desired pinning direction of the magnetization in the pinned layer 42 (called as "pinned direction"), the heat treatment temperature is gradually decreased down to a target temperature of slow cooling by a cooling rate of about 10° C./hour (slow cooling) and then the heat temperature is gradually decreased from the target temperature of slow cooling to the room temperature by a higher cooling rate of for example about 50° C./hour. By this process of slow cooling under the controlled temperature less than the blocking temperature of the anti-ferromagnetic material and the enforcement of the magnetic field toward pinning direction, exchange couplings between the pinned layer of ferromagnetic material 42 and the deposited anti-ferromagnetic layer 43 are generated.

In this embodiment shown in FIG. 6, the temperature decreasing period in the resist curing process for formation of the insulator layer of coils of the inductive write element is utilized as the slow cooling pin anneal process for magnetization of pinned layer.

However, the slow cooling pin anneal process can be also done in an independent anneal process (called as "dedicated pin anneal process"). In this case, the heat treatment temperature is elevated from the room temperature to a temperature of about 250° C. for almost 1 hour and sustaining it for almost 1 hour, under application of magnetic field of about 3 k Oe toward the pinned direction. Then, also under application of magnetic field of about 3 k Oe toward the pinned direction, the heat treatment temperature is gradually decreased down to a target temperature of slow cooling by a cooling rate of about 10° C./hour (slow cooling) and then the heat temperature is gradually decreased from the target temperature of slow cooling to the room temperature by a higher cooling rate of for example about 50° C./hour.

Furthermore, the slow cooling pin anneal process can be done in a pin anneal period executed during an orthogonal anneal process. In general, at the manufacturing of a thin-film magnetic head which has a spin valve effect MR sensor, the free layer is first magnetized toward one direction and then the pin anneal toward the orthogonal direction is executed at lower temperature during the wafer fabrication. Thus, the slow cooling pin annealing process utilizing this orthogonal magnetization (called the "orthogonal pin annealing process") can be implemented. In this case, during the temperature decreasing period, slow cooling pin anneal process according to the present invention is executed. Namely, under application of magnetic field of about 3 k Oe toward the pinned direction, the heat treatment temperature is gradually decreased down to a target temperature of slow cooling by a cooling rate of about 10° C./hour (slow cooling) and then the heat temperature is gradually decreased from the target temperature of slow cooling to the room temperature by a higher cooling rate of for example about 50° C./hour.

Figure 7:
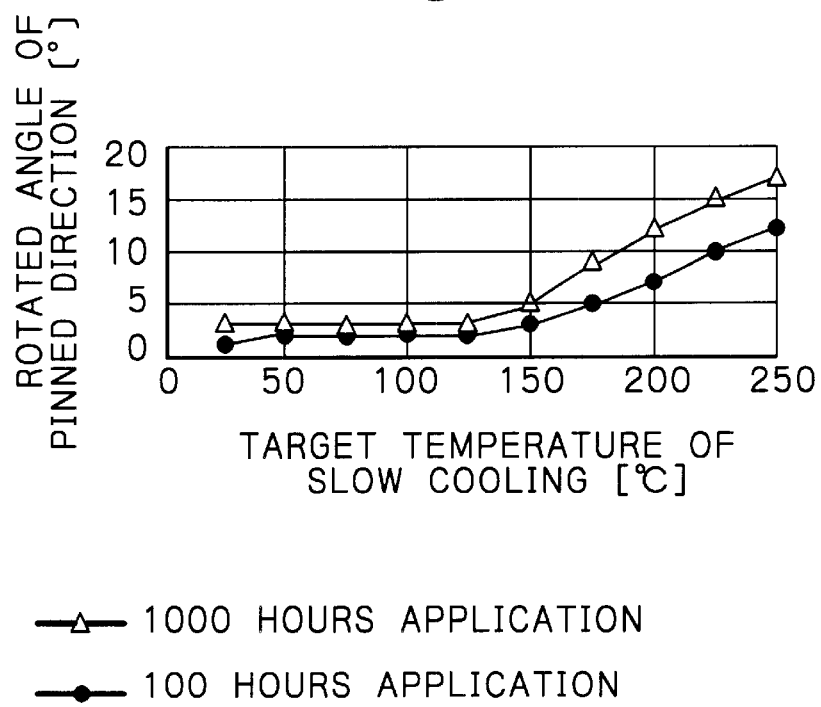
FIG. 7 is a graph of rotated angle of the direction of the magnetization of the pinned layer (pinned direction) versus target temperature of slow cooling.

Table 4 and FIG. 7 show the measured result of rotated angle of the pinned direction of various spin valve effect MR sensors which received the aforementioned slow cooling pin anneal process under different target temperatures of slow cooling from 25° C. to 250° C., when heated at 125° C. which is near the actual environment temperature of the magnetic heads under application of the magnetic field of 190 Oe toward the free direction for 100 hours and for 1000 hours.

TABLE 4

Ta(5 nm)/NiFe(9 nm)/Co(1 nm)/Cu(2.7 nm)/Co(2 nm)/RuRhMn(10 nm)/Ta(5 nm)

| Target Temperature of Slow Cooling (° C.) | Reversed Ratio | Rotated Angle of Pinned Direction (degrees) | |
|---|---|---|---|
| | | 100 Hours Application | 1000 Hours Application |
| 25 | 0.000 | 1 | 3 |
| 50 | 0.003 | 2 | 3 |
| 75 | 0.013 | 2 | 3 |
| 100 | 0.036 | 2 | 3 |
| 125 | 0.086 | 2 | 3 |
| 150 | 0.129 | 3 | 5 |
| 175 | 0.293 | 5 | 9 |
| 200 | 0.483 | 7 | 12 |
| 225 | 0.750 | 10 | 15 |
| 250 | 0.947 | 12 | 17 |

As will be understood from the Table 4 and FIG. 7, the lower target temperature of slow cooling, the more excellent thermal stability of the magnetization in the pinned layer of such spin valve effect MR sensor. However, under the target temperature of slow cooling of 125–130° C., namely under a temperature with the reversed ratio of about 0.1, the rotated angles of the pinned direction become substantially the same values. In other words, the stability of the pinned direction under high temperature environment will not improve even if the target temperature of slow cooling is set under these temperatures. Therefore, it is desired to set the target temperature at a temperature with the reversed ratio of about 0.1 so as to shorten the pin anneal process period of time.

Figure 8A:
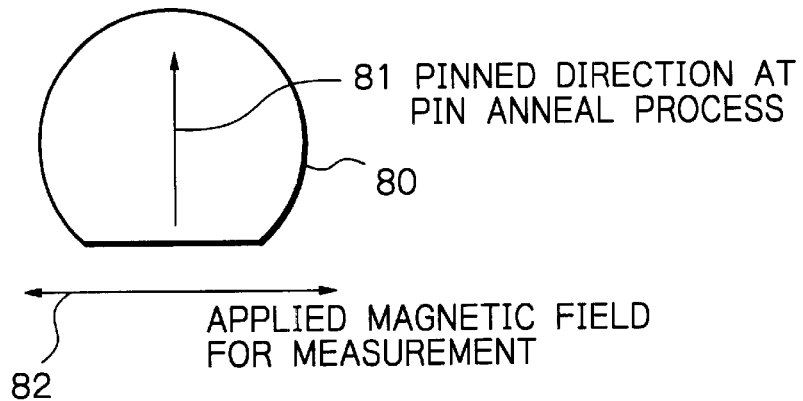
FIGS. 8a to 8c illustrate how to detect the rotated angle of the pinned direction.
Figure 8B:
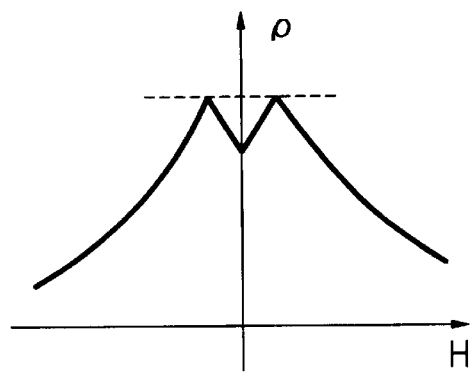
Figure 8C:
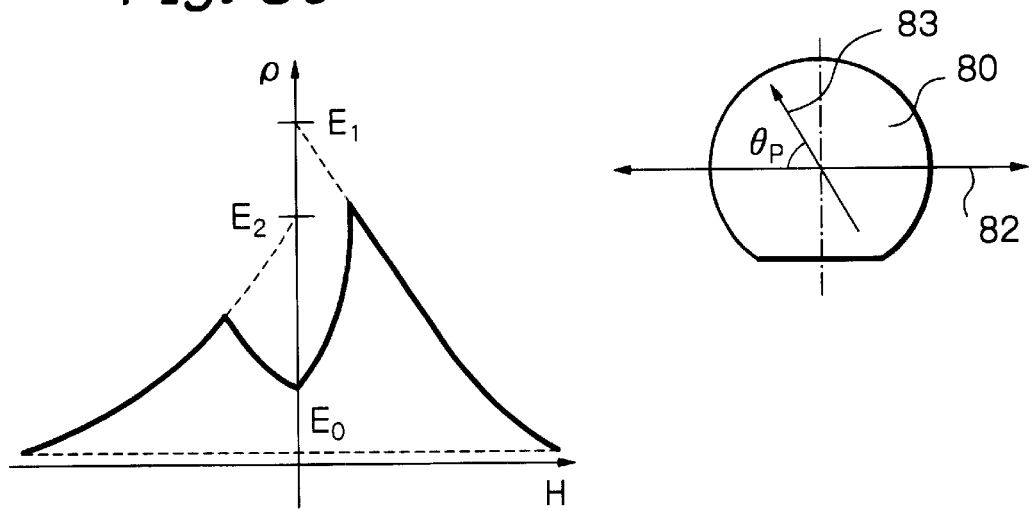

The rotation angle of the pinned direction can be easily calculated from the output level of the spin valve effect MR sensor. Namely, as shown in FIG. 8a, first a magnetic field 82, which is perpendicular to the direction of the applied magnetic field 81 namely the pinned direction, is applied to the wafer 80, then ρ-H loop is measured. If there is no rotation of the pinned direction, the measured ρ-H loop is horizontally symmetrical as shown in FIG. 8b. If there is definite rotation of the pinned direction, the measured ρ-H loop becomes horizontally unsymmetrical as shown in FIG. 8c. Assuming θp as the angle difference between the rotated pinned direction 83 and the applied measurement field direction 82, the following equation is formulated, $(E_1-E_0)/(E_2-E_0)=\{(1-\cos θp)/2\}/\{(1+\cos θp)/2\}$. Consequently θp is given the next equation, $θp=\cos^{-1}\{(E_1-E_0)/(E_2-E_1+2E_0)\}$. The rotation angle of the pinned direction is given by $90°-θp$.

Another embodiment according to the present invention which relates to manufacturing process of a composite type thin-film magnetic head that consists of a spin valve effect MR sensor or element with the anti-ferromagnetic layer 43 made of RuMn and an inductive write element is now described. In this embodiment, the slow cooling pin anneal process is implemented utilizing one of the resist-curing pin anneal process, the dedicated pin anneal process and the orthogonal pin anneal process.

Similar to that in the aforementioned cases, the heat treatment temperature is elevated from the room temperature to a temperature of about 250° C. for almost 1 hour and sustaining it for almost 1 hour, under application of magnetic field of about 3 k Oe toward the desired pinning direction of the magnetization in the pinned layer 42 (called as "pinned direction"). Then, also under application of the magnetic field of about 3 k Oe toward the pinned direction, the heat treatment temperature is gradually decreased down to a target temperature of slow cooling by a cooling rate of about 10° C./hour (slow cooling) and then the heat temperature is gradually decreased from the target temperature of slow cooling to the room temperature by a higher cooling rate of for example about 50° C./hour. By this process of slow cooling under the controlled temperature less than the blocking temperature of the anti-ferromagnetic material and the enforcement of the magnetic field toward pinning direction, exchange couplings between the pinned layer of ferromagnetic material 42 and the deposited anti-ferromagnetic layer 43 are generated.

Figure 9:
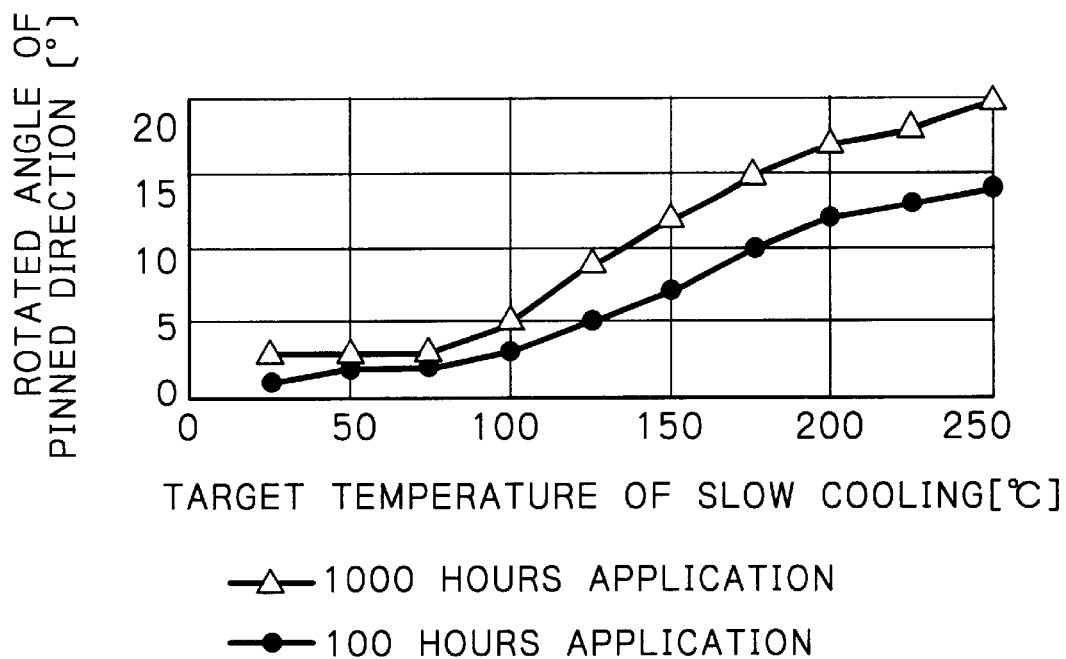
FIG. 9 is a graph of rotated angle of the pinned direction versus target temperature of slow cooling.

Table 5 and FIG. 9 show the measured result of rotated angle of the pinned direction of various spin valve effect MR sensors which received the aforementioned slow cooling pin anneal process under different target temperatures of slow cooling from 25° C. to 250° C., when heated at 125 ° C. which is near the actual environment temperature of the magnetic heads under application of the magnetic field of 190 Oe toward the free direction for 100 hours and for 1000 hours.

TABLE 5

Ta(5 nm)/NiFe(9 nm)/Co(1 nm)/Cu(2.7 nm)/Co(2 nm)/RuMn(10 nm)/Ta(5 nm)

| Target Temperature of Slow Cooling (° C.) | Reversed Ratio | Rotated Angle of Pinned Direction (degrees) | |
|---|---|---|---|
| | | 100 Hours Application | 1000 Hours Application |
| 25 | 0.000 | 1 | 3 |
| 50 | 0.030 | 2 | 3 |
| 75 | 0.060 | 2 | 3 |
| 100 | 0.106 | 3 | 5 |
| 125 | 0.125 | 5 | 9 |
| 150 | 0.129 | 7 | 12 |
| 175 | 0.223 | 10 | 15 |
| 200 | 0.384 | 12 | 17 |
| 225 | 0.875 | 13 | 18 |
| 250 | 0.973 | 14 | 20 |

As will be understood from the Table 5 and FIG. 9, the lower target temperature of slow cooling, the more excellent thermal stability of the magnetization in the pinned layer of such spin valve effect MR sensor. However, under the target temperature of slow cooling of 88° C., namely under a temperature with the reversed ratio of about 0.1, the rotated angles of the pinned direction become substantially the same values. In other words, the stability of the pinned direction under high temperature environment will not improve even if the target temperature of slow cooling is set under these temperatures. Therefore, it is desired to set the target temperature at a temperature with the reversed ratio of about 0.1 so as to shorten the pin anneal process period of time.

Another modifications and advantages in this embodiment are the same as those in the aforementioned cases.

Further embodiment according to the present invention which relates to manufacturing process of a composite type thin-film magnetic head that consists of a spin valve effect MR sensor or element with the anti-ferromagnetic layer 43 made of PtMn and an inductive write element is now described. In this embodiment, the slow cooling pin anneal process is implemented utilizing one of the resist-curing pin anneal process, the dedicated pin anneal process and the orthogonal pin anneal process.

Similar to that in the aforementioned cases, the heat treatment temperature is elevated from the room temperature to a temperature of about 280° C. for almost 1 hour and sustaining it for almost 1 hour, under application of magnetic field of about 3 k Oe toward the desired pinning direction of the magnetization in the pinned layer 42 (called as "pinned direction"). Then, also under application of the magnetic field of about 3 k Oe toward the pinned direction, the heat treatment temperature is gradually decreased down to a target temperature of slow cooling by a cooling rate of about 10° C./hour (slow cooling) and then the heat temperature is gradually decreased from the target temperature of slow cooling to the room temperature by a higher cooling rate of for example about 50° C./hour. By this process of slow cooling under the controlled temperature less than the blocking temperature of the anti-ferromagnetic material and the enforcement of the magnetic field toward pinning direction, exchange couplings between the pinned layer of ferromagnetic material 42 and the deposited anti-ferromagnetic layer 43 are generated.

Figure 10:
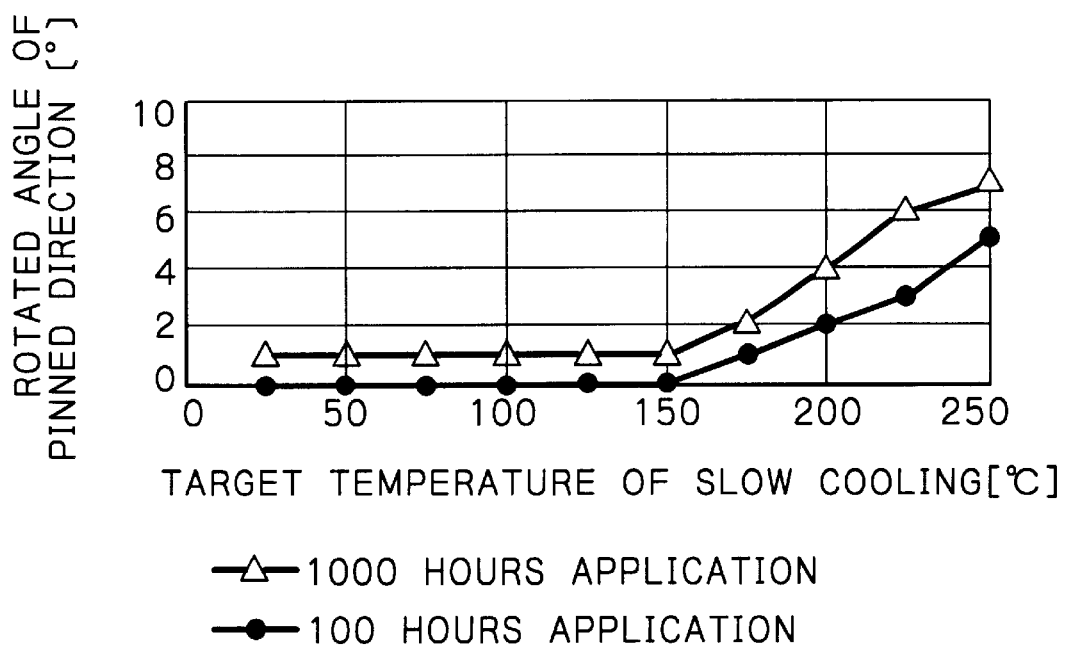
FIG. 10 is a graph of rotated angle of the pinned direction versus target temperature of slow cooling.

Table 6 and FIG. 10 show the measured result of rotated angle of pinned direction of various spin valve effect MR sensors which received the aforementioned slow cooling pin anneal process under different target temperatures of slow cooling from 25° C. to 300° C., when heated at 125° C. which is near the actual environment temperature of the magnetic heads under application of the magnetic field of 190 Oe toward the free direction for 100 hours and for 1000 hours.

TABLE 6

Sub/Ta(5 nm)/PtMn(30 nm)/Co(3 nm)/Cu(3 nm)/Co(1 nm)/NiFe(9 nm)/Ta(5 nm)

| Target Temperature of | | Rotated Angle of Pinned Direction (degrees) | |
| --- | --- | --- | --- |
| Slow Cooling (° C.) | Reversed Ratio | 100 Hours Application | 1000 Hours Application |
| 25 | 0.000 | 0 | 1 |
| 50 | 0.010 | 0 | 1 |
| 75 | 0.014 | 0 | 1 |
| 100 | 0.018 | 0 | 1 |
| 125 | 0.034 | 0 | 1 |
| 150 | 0.050 | 0 | 1 |
| 175 | 0.111 | 1 | 2 |
| 200 | 0.213 | 2 | 4 |
| 225 | 0.389 | 3 | 6 |
| 250 | 0.541 | 5 | 7 |
| 275 | 0.705 | 6 | 8 |
| 300 | 0.808 | 8 | 10 |

As will be understood from the Table 6 and FIG. 10, the lower target temperature of slow cooling, the more excellent thermal stability of the magnetization in the pinned layer of such spin valve effect MR sensor. However, under the target temperature of slow cooling of 170° C., namely under a temperature with the reversed ratio of about 0.1, the rotated angles of the pinned direction become substantially the same values. In other words, the stability of the pinned direction under high temperature environment will not improve even if the target temperature of slow cooling is set under these temperatures. Therefore, it is desired to set the target temperature at a temperature with the reversed ratio of about 0.1 so as to shorten the pin anneal process period of time.

Another modifications and advantages in this embodiment are the same as those in the aforementioned cases.

Following are comparison examples with different cooling rate during the slow cooling treatment from that in the aforementioned cases with the cooling rate of about 10° C./hour.

Figure 11:
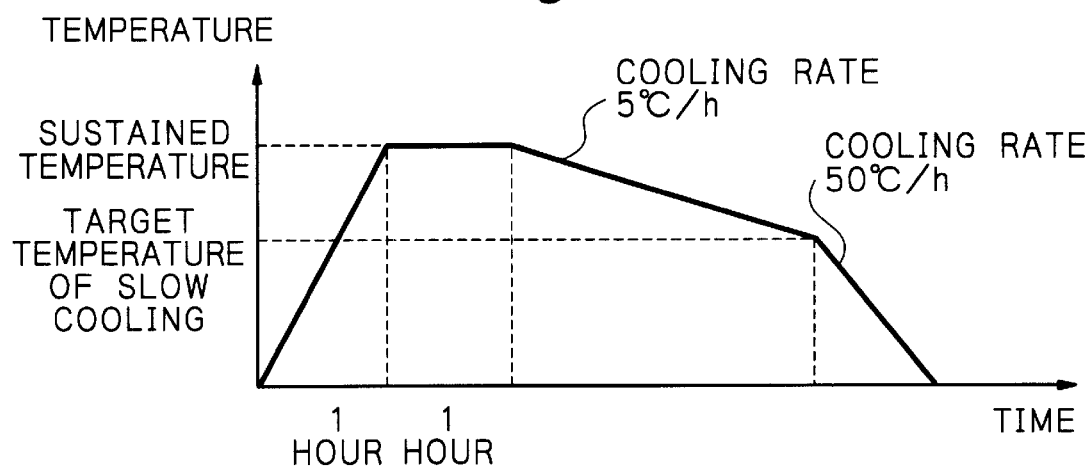
FIG. 11 illustrates a pin anneal profile in a comparison example.

FIG. 11 illustrates a pin anneal profile in one comparison example with a slower cooling rate of about 5° C./hour, and the horizontal and vertical axes of the profiles are associated with time and temperature, respectively.

In this comparison example, the heat treatment temperature is elevated from the room temperature to a temperature of about 250° C. (in case the anti-ferromagnetic layer 43 is made of RuRhMn or RuMn) or about 280° C. (in case the anti-ferromagnetic layer 43 is made of PtMn) for almost 1 hour and sustaining it for almost 1 hour, under application of magnetic field of about 3 k Oe toward the desired pinning direction of the magnetization in the pinned layer 42 (called as "pinned direction"). Then, also under application of the magnetic field of about 3 k Oe toward the pinned direction, the heat treatment temperature is gradually decreased down to a target temperature of slow cooling by a cooling rate of about 5° C./hour (slow cooling) and then the heat temperature is gradually decreased from the target temperature of slow cooling to the room temperature by a higher cooling rate of for example about 50° C./hour.

Figure 12:
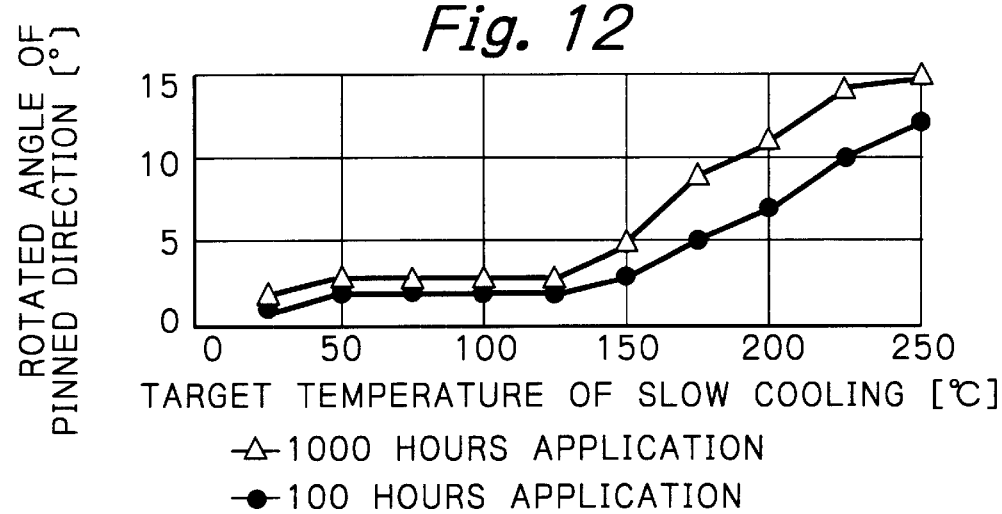
FIG. 12 is a graph of rotated angle of the pinned direction versus target temperature of slow cooling.
Figure 13:
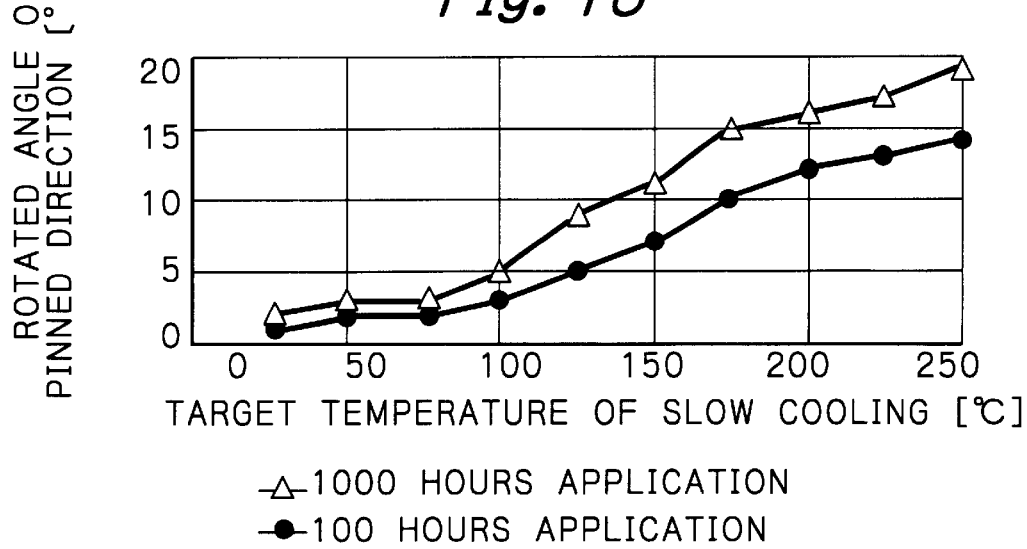
FIG. 13 is a graph of rotated angle of the pinned direction versus target temperature of slow cooling.

Tables 7 to 9 and FIGS. 12 to 14 show the measured result of rotated angle of the pinned direction of various spin valve effect MR sensors which received the aforementioned slow cooling pin anneal process under different target temperatures of slow cooling from 25° C. to 250° C. or to 300° C., when heated at 125° C. which is near the actual environment temperature of the magnetic heads under application of the magnetic field of 190 Oe toward the free direction for 100 hours and for 1000 hours. Table 7 and FIG. 12 is the case the anti-ferromagnetic layer 43 is made of RuRhMn, Table 8 and FIG. 13 is the case the anti-ferromagnetic layer 43 is made of RuMn, and Table 9 and FIG. 14 is the case the anti-ferromagnetic layer 43 is made of PtMn.

TABLE 7

Ta(5 nm)/NiFe(9 nm)/Co(1 nm)/Cu(2.7 nm)/Co(2 nm)/RuRhMn(10 nm)/Ta(5 nm)

| Target Temperature of | | Rotated Angle of Pinned Direction (degrees) | |
| --- | --- | --- | --- |
| Slow Cooling (° C.) | Reversed Ratio | 100 Hours Application | 1000 Hours Application |
| 25 | 0.000 | 1 | 3 |
| 50 | 0.003 | 2 | 3 |
| 75 | 0.013 | 2 | 3 |
| 100 | 0.036 | 2 | 3 |
| 125 | 0.085 | 2 | 3 |
| 150 | 0.129 | 3 | 5 |
| 175 | 0.293 | 5 | 9 |
| 200 | 0.483 | 7 | 11 |
| 225 | 0.750 | 10 | 14 |
| 250 | 0.947 | 12 | 15 |

TABLE 8

Ta(5 nm)/NiFe(9 nm)/Co(1 nm)/Cu(2.7 nm)/Co(2 nm)/RuMn(10 nm)/Ta(5 nm)

| Target Temperature of | | Rotated Angle of Pinned Direction (degrees) | |
| --- | --- | --- | --- |
| Slow Cooling (° C.) | Reversed Ratio | 100 Hours Application | 1000 Hours Application |
| 25 | 0.000 | 1 | 2 |
| 50 | 0.030 | 2 | 3 |
| 75 | 0.060 | 2 | 3 |
| 100 | 0.106 | 3 | 5 |
| 125 | 0.125 | 5 | 9 |
| 150 | 0.223 | 7 | 11 |
| 175 | 0.384 | 10 | 15 |

TABLE 8-continued

Ta(5 nm)/NiFe(9 nm)/Co(1 nm)/Cu(2.7 nm)/Co(2 nm)/RuMn(10 nm)/Ta(5 nm)

| Target Temperature of Slow Cooling (° C.) | Reversed Ratio | Rotated Angle of Pinned Direction (degrees) | |
|---|---|---|---|
| | | 100 Hours Application | 1000 Hours Application |
| 200 | 0.616 | 12 | 16 |
| 225 | 0.875 | 13 | 17 |
| 250 | 0.973 | 14 | 19 |

TABLE 9

Sub/Ta(5 nm)/PtMn(30 nm)/Co(3 nm)/Cu(3 nm)/Co(1 nm)/NiFe(9 nm)/Ta(5 nm)

| Target Temperature of Slow Cooling (° C.) | Reversed Ratio | Rotated Angle of Pinned Direction (degrees) | |
|---|---|---|---|
| | | 100 Hours Application | 1000 Hours Application |
| 25 | 0.000 | 0 | 1 |
| 50 | 0.010 | 0 | 1 |
| 75 | 0.014 | 0 | 1 |
| 100 | 0.018 | 0 | 1 |
| 125 | 0.034 | 0 | 1 |
| 150 | 0.050 | 0 | 1 |
| 175 | 0.111 | 1 | 2 |
| 200 | 0.213 | 2 | 4 |
| 225 | 0.389 | 3 | 6 |
| 250 | 0.541 | 5 | 7 |
| 275 | 0.705 | 6 | 8 |
| 300 | 0.808 | 8 | 9 |

FIG. 15 illustrates a pin anneal profile in another comparison example with a faster cooling rate of about 30° C./hour, and the horizontal and vertical axes of the profiles are associated with time and temperature, respectively.

In this comparison example, the heat treatment temperature is elevated from the room temperature to a temperature of about 250° C. (in case the anti-ferromagnetic layer 43 is made of RuRhMn or RuMn) or about 280° C. (in case the anti-ferromagnetic layer 43 is made of PtMn) for almost 1 hour and sustaining it for almost 1 hour, under application of magnetic field of about 3 k Oe toward the desired pinning direction of the magnetization in the pinned layer 42 (called as "pinned direction"). Then, also under application of the magnetic field of about 3 k Oe toward the pinned direction, the heat treatment temperature is gradually decreased down to a target temperature of slow cooling by a cooling rate of about 30° C./hour (slow cooling) and then the heat temperature is gradually decreased from the target temperature of slow cooling to the room temperature by a higher cooling rate of for example about 50° C./hour.

Figure 17:
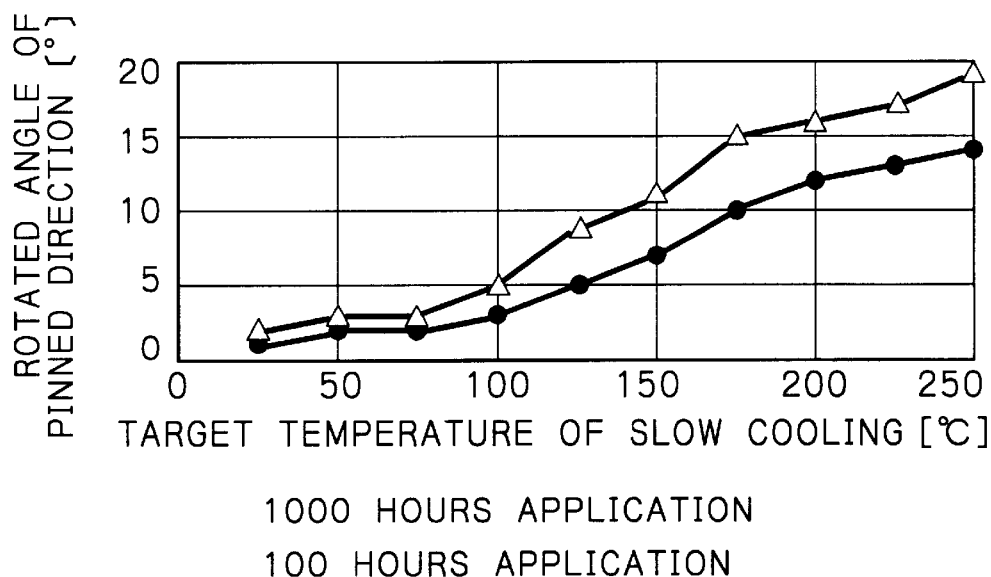
FIG. 17 is a graph of rotated angle of the pinned direction versus target temperature of slow cooling.
Figure 18:
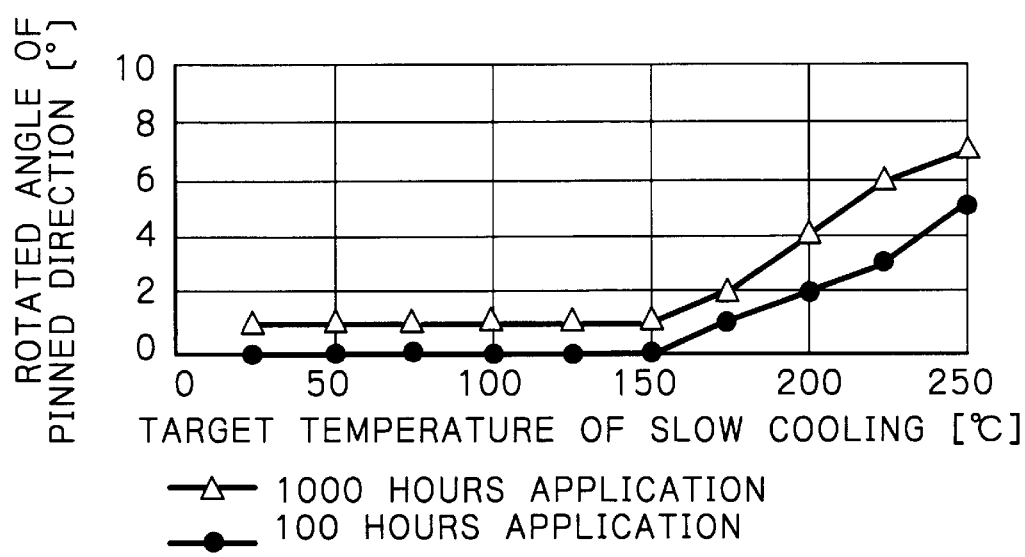
FIG. 18 is a graph of rotated angle of the pinned direction versus target temperature of slow cooling.

Tables 10 to 12 and FIGS. 16 to 18 show the measured result of rotated angle of the pinned direction of various spin valve effect MR sensors which received the aforementioned pin anneal process under different target temperatures of slow cooling from 25° C. to 250° C. or to 300° C., when heated at 125° C. which is near the actual environment temperature of the magnetic heads under application of the magnetic field of 190 Oe toward the free direction for 100 hours and for 1000 hours. Table 10 and FIG. 16 is the case the anti-ferromagnetic layer 43 is made of RuRhMn, Table 11 and FIG. 17 is the case the anti-ferromagnetic layer 43 is made of RuMn, and Table 12 and FIG. 18 is the case the anti-ferromagnetic layer 43 is made of PtMn.

TABLE 10

Ta(5 nm)/NiFe(9 nm)/Co(1 nm)/Cu(2.7 nm)/Co(2 nm)/RuRhMn(10 nm)/Ta(5 nm)

| Target Temperature of Slow Cooling (° C.) | Reversed Ratio | Rotated Angle of Pinned Direction (degrees) | |
|---|---|---|---|
| | | 100 Hours Application | 1000 Hours Application |
| 25 | 0.000 | 4 | 6 |
| 50 | 0.003 | 5 | 6 |
| 75 | 0.013 | 5 | 6 |
| 100 | 0.036 | 5 | 6 |
| 125 | 0.085 | 5 | 6 |
| 150 | 0.129 | 6 | 8 |
| 175 | 0.293 | 8 | 12 |
| 200 | 0.483 | 10 | 15 |
| 225 | 0.750 | 13 | 18 |
| 250 | 0.947 | 15 | 20 |

TABLE 11

Ta(5 nm)/NiFe(9 nm)/Co(1 nm)/Cu(2.7 nm)/Co(2 nm)/RuMn(10 nm)/Ta(5 nm)

| Target Temperature of Slow Cooling (° C.) | Reversed Ratio | Rotated Angle of Pinned Direction (degrees) | |
|---|---|---|---|
| | | 100 Hours Application | 1000 Hours Application |
| 25 | 0.000 | 4 | 6 |
| 50 | 0.030 | 5 | 6 |
| 75 | 0.060 | 5 | 6 |
| 100 | 0.106 | 6 | 8 |
| 125 | 0.125 | 8 | 12 |
| 150 | 0.223 | 10 | 15 |
| 175 | 0.384 | 13 | 18 |
| 200 | 0.616 | 15 | 20 |
| 225 | 0.875 | 16 | 21 |
| 250 | 0.973 | 17 | 23 |

TABLE 12

Sub/Ta(5 nm)/PtMn(30 nm)/Co(3 nm)/Cu(3 nm)/Co(1 nm)/NiFe(9 nm)/Ta(5 nm)

| Target Temperature of Slow Cooling (° C.) | Reversed Ratio | Rotated Angle of Pinned Direction (degrees) | |
|---|---|---|---|
| | | 100 Hours Application | 1000 Hours Application |
| 25 | 0.000 | 2 | 3 |
| 50 | 0.010 | 2 | 3 |
| 75 | 0.014 | 2 | 3 |
| 100 | 0.018 | 2 | 3 |
| 125 | 0.034 | 2 | 3 |
| 150 | 0.050 | 2 | 3 |
| 175 | 0.111 | 3 | 4 |
| 200 | 0.213 | 4 | 6 |
| 225 | 0.389 | 5 | 8 |
| 250 | 0.541 | 7 | 9 |
| 275 | 0.705 | 8 | 10 |
| 300 | 0.808 | 10 | 12 |

As will be apparent by comparing these comparison examples and the aforementioned cases, the slower cooling rate in the slow cooling pin anneal process, the more excellent thermal stability of the magnetization in the pinned layer of such spin valve effect MR sensor. However, under the cooling rate of about 10° C./hour, the rotated angles of the pinned direction become substantially the same values. In other words, the stability of the pinned direction under high temperature environment will not improve even if the cooling rate is set under about 10° C./hour. Therefore, it is desired to set the cooling rate to about 10° C./hour or more but near about 10° C./hour so as to shorten the pin anneal process period of time.

When a vacuum heat treatment furnace operated under magnetic field is naturally cooled, the cooling rate is in general about 50 about 10° C./hour. Thus, preferably the cooling rate is kept at about 10 to 50 about 10° C./hour, more preferably at a slower rate within this range, and most preferably at about 10° C./hour, until the heat treatment temperature decreases to the target temperature of slow cooling, namely a temperature with the reversed ratio of about 0.1.

It should be noted that the anti-ferromagnetic materials used in the aforementioned embodiments show only some examples and therefore another various anti-ferromagnetic materials such as NiMn, IrMn, PtPdMn or PtCrMn can be used. Furthermore, process conditions of enforced magnetic field strength, temperature profiles and number of applied pin annealing processes in implementing resist curing pin annealing process, the dedicated pin annealing process and the orthogonal pin annealing process are also examples. The process conditions depend upon the structure of thin-film head, the materials of the layers, the thickness of the layers and the requirements of thermal stability of pinned magnetization.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a thin-film magnetic head with a magnetoresistive effect multi-layered structure using exchange coupling magnetic bias, comprising the steps of:

forming the magnetoresisitive effect multi-layered structure; and providing the exchange coupling magnetic bias to said magnetoresistive effect multi-layered structure by an annealing process, said annealing process including a step of gradually decreasing the temperature of said multi-layered structure to a first temperature under application of magnetic field in a particular direction;

wherein said gradually decreasing step is a step of decreasing the temperature of said magnetoresistive effect multi-layered structure to the first temperature at a cooling rate with a range of 100° C./hour to 50° C./hour under application of magnetic field toward the particular direction.

2. The method as claimed in claim 1, wherein said decreasing step is a step of decreasing the temperature of said magnetoresistive effect multi-layered structure to the first temperature at a cooling rate of about 10° C./hour under application of magnetic field in a particular direction.

3. The method as claimed in claim 1, wherein said first temperature is a temperature higher than room temperature.

4. The method as claimed in claim 1, wherein said forming step includes a step of forming a magnetoresistive effect multi-layered structure with a ferromagnetic layer and an anti-ferromagnetic layer using exchange coupling magnetic bias between the layers, and wherein said first temperature is a temperature at which a reversed ratio of said anti-ferromagnetic layer becomes about 0.1.

5. The method as claimed in claim 1, wherein said forming step includes a step of forming a spin valve effect magnetoresistive effect multi-layered structure including first and second layers of a ferromagnetic material separated by a layer of non-magnetic electrically conductive material, and an adjacent layer of anti-ferromagnetic material formed in physical contact with the second ferromagnetic layer.

6. The method as claimed in claim 1, wherein said annealing process is done at a dedicated heat treatment process under application of the magnetic field, independent from processes in wafer fabrication.

7. The method as claimed in claim 6, wherein said dedicated heat treatment process under application of the magnetic field includes a step of elevating the temperature of said multi-layered structure to a second temperature under application of said magnetic field in the particular direction, a step of sustaining said second temperature under application of magnetic field in the particular direction, and a step of gradually decreasing the temperature of said multi-layered structure to the first temperature under application of magnetic field in the particular direction.

8. A method of manufacturing a thin-film magnetic head with a magnetoresistive effect multi-layered structure using exchange coupling magnetic bias, comprising the steps of:

forming the magnetoresisitive effect multi-layered structure; and providing the exchange coupling magnetic bias to said magnetoresistive effect multi-layered structure by an annealing process, said annealing process including a step of gradually decreasing the temperature of said multi-layered structure to a first temperature under application of magnetic field in a particular direction;

wherein said annealing process is done as a part of another heat treatment process in wafer fabrication.

9. The method as claimed in claim 8, wherein said another heat treatment process is a resist curing process.

10. The method as claimed in claim 1, wherein said annealing process is done during a dedicated heat treatment process under application of the magnetic field, where said annealing process is independent from processes in wafer fabrication.

11. The method as claimed in claim 10, wherein said dedicated heat treatment process under application of the magnetic field includes a step of elevating the temperature of said multi-layered structure to a second temperature under application of magnetic field in the particular direction, a step of sustaining said second temperature under application of magnetic field in the particular direction, and a step of gradually decreasing the temperature of said multi-layered structure to the first temperature under application of magnetic field in the particular direction.

12. The method as claimed in claim 10, wherein said another heat treatment process is a resist curing process.

13. The method as claimed in claim 12, wherein said resist curing process includes a process for elevating the heat treatment temperature to a second temperature and for sustaining said second temperature for a specified duration time under application of an applied magnetic field in a direction perpendicular to said particular direction.

* * * * *